United States Patent [19]

Osgerby

[11] Patent Number: 4,755,325

[45] Date of Patent: Jul. 5, 1988

[54] PROCESS FOR EMULSIFYING OIL AND WATER MIXTURE

[75] Inventor: Ian T. Osgerby, Bedford, Mass.

[73] Assignee: Columbia Chase Corporation, Braintree, Mass.

[21] Appl. No.: 904,632

[22] Filed: Sep. 8, 1986

[51] Int. Cl.[4] ............................ B01F 5/06; B01J 13/00

[52] U.S. Cl. ........................................ 252/314; 44/51; 252/309; 366/176; 366/340

[58] Field of Search ................ 252/309, 314; 366/176, 366/340; 44/51

[56] References Cited

U.S. PATENT DOCUMENTS 2,125,245 7/1938 McCray .......................... 366/340 X
3,176,921 4/1965 DeVoe ................................ 431/2 X

FOREIGN PATENT DOCUMENTS 0160392 9/1983 Japan ...................................... 44/51

*Primary Examiner*—Richard D. Lovering
*Attorney, Agent, or Firm*—Andrew F. Kehoe

[57] ABSTRACT

A water-emulsification apparatus comprising a conduit and, within the conduit, a series of perforated plates of holes of varying shapes or sizes forming means to effect different shearing action on an oil/water mixture and means for pumping the oil/water mixture therethrough. The conduit system is conveniently constructed so that oil-water mixtures of different characteristics can be directed to flow through different sequences of a perforated plates, thereby achieving an emulsion of desired characteristics.

7 Claims, 1 Drawing Sheet

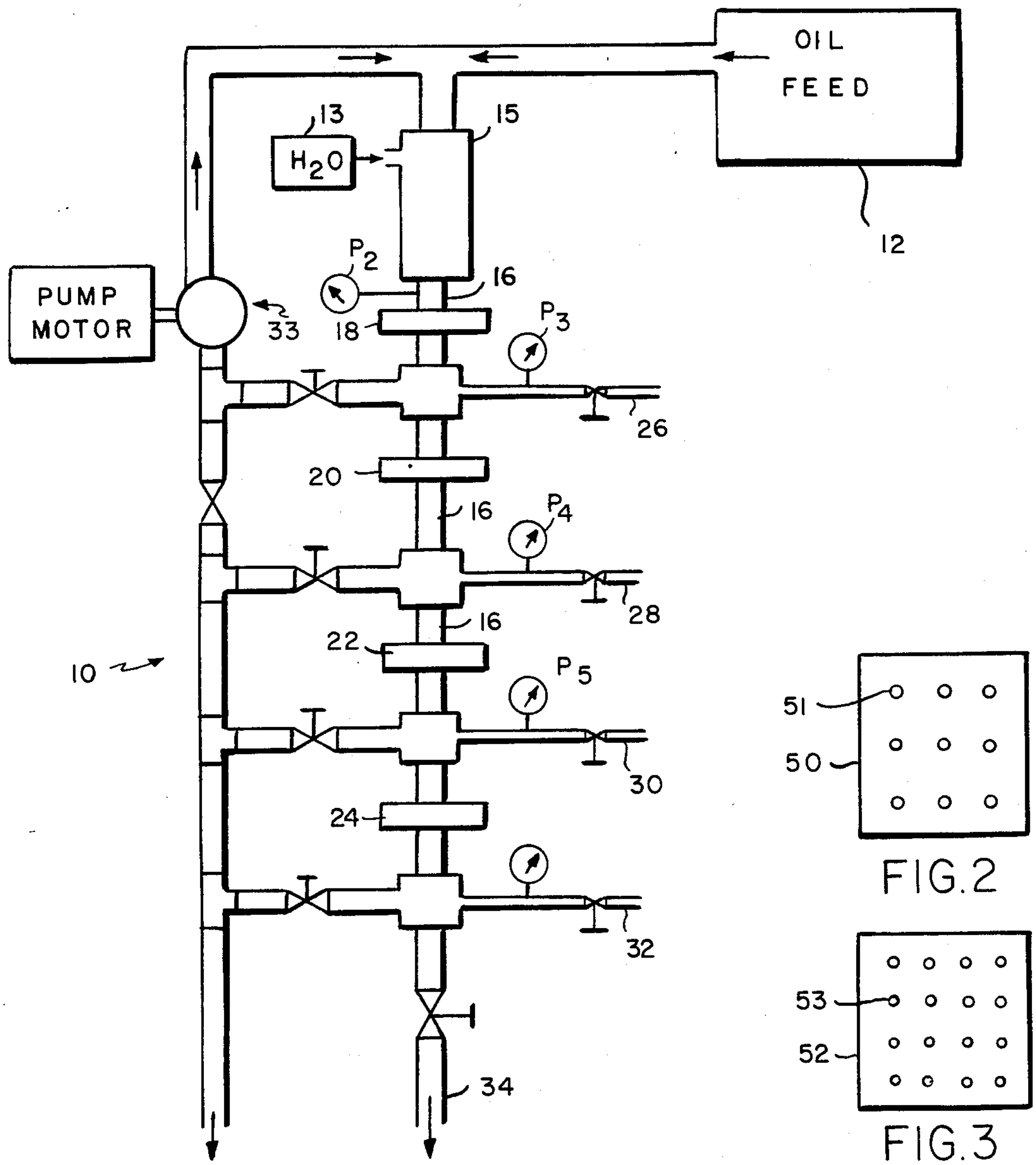
FIG. 1
FIG. 2
FIG. 3
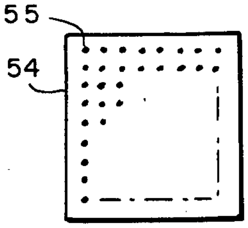
FIG. 4

PROCESS FOR EMULSIFYING OIL AND WATER MIXTURE

BACKGROUND OF THE INVENTION

This invention relates to a novel apparatus for forming emulsions of oil in water and, in particular, for processing various water-oil mixtures into emulsions of desired characteristics, for example, optimum water-droplet size within the oil matrix of the emulsion.

The use of water-in-oil emulsions is well known in the art of combustion. Not only can small quantities of water act as a catalyst in combustion of hydrocarbon fuels, but the water can allow attainment of higher operating temperatures, cleaner heat-transfer surfaces and the resulting efficiencies of combustion attributable to such benefits. As a consequence, a great deal of work has gone into providing means and processes for making and using water oil emulsions. Among some of the patents relating to this art are:

U.S. Pat. Nos. 4,008,038; 4,116,160 and 4,144,015 to Berthiaume discuss some emulsification systems related to the augmentation of emulsions with gases tending to expand to form microdroplets for combustion. U.S. Pat. No. 4,479,805 to Batra describes the use of similar equipment to diminish the size of asphaltene "particles" in fuel with the aid of the presence of water. Other inventions related to formation of such emulsions include U.S. Pat. No. 4,081,863 to Rees describing a high-pressure emulsifier. Other patents relating to water in combustion fuel are U.S. Pat. Nos. 3,938,933 to Armas; 3,862,819 to Wentworth; 3,814,567; 3,979,992; 3,741,712; and 3,766,942 to Delatronchette; 3,527,581 to Brownwell; 3,606,868 to Voogd; and 2,104,311 to Russell.

Among publications relating to emulsion of oil in water are "Emulsions as Fuels" Mechanical Engineering, November 1976, Pages 36–41 and "The Effect of Water/Residual Oil Emulsions on Air Pollutant Emissions & Efficiency of Commercial Boiler" ASME Paper No. 75-WA/APC-1 delivered at the 1975 Winter Annual Meeting of the American Society of Mechanical Engineers, Nov. 30, to Dec. 4, 1975 in Houston, Tex.

Flocculation of oil has been reported upon in an article by Suzuki, A. et al in J. Colloid & Int. Science, 29 (3) 552, 1969, and in an article by Fogler et al: "Physical Properties and Stability of Water in Fuel Oil Emulsions; DOT/RSPA/DPB 50/79/16.

Other publications have taught the importance of water-droplet size in fuel systems indicating that the sizes could be too small as well as too large.

In spite of the large amount of attention given to the subject, it still has been a problem to provide an apparatus which would allow one to obtain the optimum emulsion for a given water-oil system even though the properties of oil to be emulsified and even the amount of water to be used in forming the emulsification vary substantially from time to time.

SUMMARY OF THE INVENTION

A principle object of the invention is to provide emulsification apparatus having variable emulsification means to achieve desired water/oil emulsion output characteristics with minimum dependence on the characteristics of the oil or water/oil mixture fed into the system.

Another object of the invention is to minimize power used to obtain suitable emulsification of oil/water mixtures.

Still another object of the invention is to provide simple means to obtain an emulsification of oil and water that substantially reduces the quantity of water present in excessively small droplets.

A further object of the invention is to provide a system that can be readily adapted for use as a means to maintain minimum emulsification, during storage, of an emulsion or to obtain optimum emulsification immediately prior to combustion of the emulsified fuel mix.

Other objects of the invention will be obvious to those skilled in the art on their reading of the present invention.

The above objects have been achieved by providing emulsifier apparatus in which an oil-water mixture to be processed is forced through a series of perforated plates in a conduit. The number, shape, and size of perforations, in each plate, is selected to co-operate with the same parameters of each other plate so that together they provide suitable shear means for emulsifying said liquid mixture as it is forced through the conduit.

It is to be understood that the precise number of plates and the size of the apertures therein can vary substantially depending upon the viscosity characteristics of the oil, the amount of water present, the temperature of the process, and, of course, the exact emulsification characteristics sought for the product.

The perforations in at least some of the plates will provide perforations of such number, size, and shape that they result in suitable severe shear means to aid emulsification (in most cases) or, provide a desirable degree of re-agglomeration of an excessively emulsified material.

The varying degree of shear can be achieved in a number of ways. For example, the number of apertures of a given shape could be varied from plate-to-plate resulting in more shear at the plate of fewer apertures. In addition, consecutive plates could have different ratios of wetted perimeter of apertures relative to the cross-section of liquid flow through the aperture. This, for example, could be achieved by changing the shapes of the apertures through the plates. Probably, the most convenient scheme is to use smaller holes of simple shape, say circles, in different plates, thereby adjusting the shearing characteristics at a given flow rate. It is less convenient, but it is also possible to achieve a similar processing results (a) by keeping the shape and size apertures in the processing plates constant but having the conduit vary to selectively increase velocity through apertures in some of the plates and (b) by reducing the number of apertures in some plates to assure higher effective velocities of the liquid to be emulsified therethrough. However, in the latter case, one would tend to have blind spots in the processing plates with fewer apertures. In the former case, the interchangeability of ports along a system would be markedly reduced.

It is convenient and desirable, to construct the apparatus of the invention using single-diameter conduit, to have means to selectively direct incoming flow to flow through a specific sequence of plates. Moreover, in most applications, it has been found most practical, in applications where plates of differing aperture sizes are used, to place the more severe shear plate after the less severe shear plate.

It should not be presumed, however, that the more severe means will always act to decrease the size of the dispersed phase. One surprising aspect of the invention is that an excessively-emulsified mixture (one having too many and too-small oil-droplets) can often be quickly reconstituted to an improved emulsion with further processing through small perforations. Thus, the apparatus, if presented with an excessively emulsified material, can be used as a de-emulsifier, restoring "water-droplet" size to the preferred 2-10 micron range of diameter.

However, a main advantages of the invention is that it allows a desirable emulsification to be achieved at a given installation even though inlet composition of the mixture changes and that it can be adjusted in configuration to reduce energy consumption when recirculation (as to a storage tank) is required rather than emulsification for direct use in combustion.

As some general rules in selecting a system, it may be said that, in most processing systems:

(a) Large oil drops are reduced in multiple-plate passes to very small droplets. Normally, at least two plates are advantageous.

(b) Even as large drops are reduced, very small droplets, for example those below two microns in diameter, tend to reagglomerate, i.e. coalesce, into larger drops.

(c) Increased throughput, increased viscosity of the oil, and smaller aperture size tend to result in decreased droplet size at a given flow rate.

(d) Heavier oil, i.e. more viscous oil, is more efficiently processed with larger apertures than with very small apertures.

Among suitable hole sizes in the incoming emulsification flow rate range of 100 gallons per hour such as Number 6 Oil are circular holes in the 0.05 to 0.25-inch diameter range. In general, it is desirable to reduce the oil-droplet diameter to less than about 2-10 microns, preferably to 2-5 microns.

Spacing of the plates is not unimportant. Spacing can have a substantial effect upon the effect of a given sequence of plates on a given water/oil emulsion. In general, it is believed desirable to have the plates separated by a distance of 50 to 200 times the diameter of the aperture through which it passes. This length will be adequate to allow merging of all the fluid jets passing through the apparatus when a design criteria of 4:1 is used as the ratio between fluid velocity through the apertures and average velocity in the inter-plate conduit.

The invention provides an emulsification procedure which can be utilized to obtain a number of advantages depending on the requirements of a particular fuel-processing installation. Thus, the relatively inexpensive design of the apparatus can be used to eliminate the need to utilize one or more recirculation pumps as are required for some oil/water conditioners now on the market. Moreover, simple valving arrangements can be used with the system of the invention to allow an assembly of perforated plates to handle a range of fuel characteristics while achieving desired oil/water emulsification characteristics with each fuel.

Plate design: The ratio of aperture diameter to plate thickness is conveniently in the range of from about 0.3 to 3.0. This ratio determines the flow pattern, sometimes called "jet development" downstream of the aperture. The holes are normally spaced more than a diameter apart. Typically, the sum of the hole diameters in a plate will equal about 20-35% of the conduit cross-section through which the oil flows.

Conduits Between Plates: The conduit section between the plates should provide a "jet merging" zone of at least from about 50 to 200 hole diameters based on the hole in the preceding plate. Longer zones are permissable but unnecessary.

Oil/water mixtures processed by the invention most advantageously contain water in a range of from 3 to 10% (by volume). However, emulsions of up to 20% by water, and even higher, can be processed. Emulsions of higher water content are particularly enhanced by achieving a good (i.e. narrow) droplet size distribution.

In general, a once-through processing using two apertured processing plates gives a result approximately similar to recirculating oil/water through a set of apertures of the same size. However, additional benefits can be achieved with many emulsions by using downstream plates of smaller aperture size to improve droplet size and/or droplet-size distribution by minimizing the occurrence of droplets below about 2 microns in diameter.

It is to be understood that a plurality of the multiplate processing units can be assembled in parallel to provide greater throughput capacity. Also, it is to be understood that any of a number of valving systems can be used with the apparatus and process of the invention to direct the fluid mixture being processed to flow through any sequence of selected plates as may be suitable for a given application.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular base.

BRIEF DESCRIPTION OF DRAWINGS

FIG. 1 is a schematic piping diagram illustrating an emulsifier of the invention.

FIGS. 2 through 4 illustrate a typical apertured processing plate used in the emulsification apparatus.

Referring to FIG. 1, it is seen that emulsifier 10 comprises a source 12 of oil and a source 13 of water. Water and oil are fed into a conventional static mixer 15, e.g. of the type sold under the designation "KOMAX", to form a relatively coarse oil/water mixture. The mixture is pumped through conduit 16. Conduit 16 comprises, flange-mounted for convenient insertion and removal, and a series of perforated processing plates 18, 20, 22, and 24. The diameter of the conduits between plates is nominally about 2 inches. The plates were spaced about 12 inches apart to allow access for sampling. These apertured plates are the only plates in the apparatus.

The mixture is forced through selected plates 18, 20, 22, and 24 in series. Of course, it is possible to remove some of these plates. For example, one could remove plates 22 and 24 and merely use the first two processing plates 18 and 20. Samples can be withdrawn downstream of each plate via valves sample parts 26, 28, 30, and 32.

A recirculation pump 33 is provided for use in exceptional cases when the flow rate of the oil would drop so low that effective processing velocity would not be maintained for a given system. In such cases, not believed to be typical nor optimal, the oil flow through the processing plates is increased to an effective velocity. In general, fluid velocities of about 60–200 feet per minute through the apertured plates are convenient, and it is believed to be most efficient to have an average velocity reduction of about 3 to 12 times before the fluid enters the apertures of the next processing plate.

The illustrated example is a highly flexible apparatus. The plates, 18 etc. are mounted for easy removal, much as in-line filters are conveniently mounted in the chemical process industry. (Details of construction are not shown in the drawing because they are well known in the chemical engineering and oil-processing arts.)

FIG. 2 is a schematic diagram of a plate 50, 0.125 inch thick found useful in the invention. The plate comprises nine holes 51, each of 0.25-inch diameter with the holes spaced about 0.3 inches apart.

FIG. 3 is a schematic diagram of a plate 52 with holes 53. The plate is 0.125 inches thick. It has 36 holes of diameter 0.125 inch spaced about 0.18 inch apart.

FIG. 4 is a schematic diagram of a plate 54 with holes 55. The plate, 0.125 inch thick, has 144 holes of 0.0625 inch.

The following Examples are presented to illustrate the advantages of the flow-through emulsifier of the invention in the formation and tailoring of water/oil emulsification.

EXAMPLE 1

A Number 6 oil of high sulfur, high viscosity (about 300 Saybolt Seconds Universal at 122° F.) was treated to a flow rate of about 3 gallons per minute (oil basis). The oil contained an additional 10% by volume of water mixed therein (but not emulsified to achieve any substantial degree of stability). The fuel mixture being treated was heated to about 140° F.

This oil was pumped one time through a system as shown in FIG. 1 utilizing four spaced, perforated plates with nine 0.25-inch apertures as seen in FIG. 2.

Samples observed after the mixture had passed through four plates 18, 20, 22 and 24 showed that the water was emulsified such that most water was in the form of drops from 2 to 10 microns in diameter.

Sampling between plates indicated that most of the emulsification took place after passage through two plates. Marginal improvement took place after the third and fourth plates.

EXAMPLES 2 & 3

Example 1 was repeated but the processing plates were replaced with a plate having 36 holes of 0.125-inch diameter. The resulting emulsion, after passing through two plates, had an excessive number of water droplets below 2 microns in diameter. These were considered too small for optimum combustion characteristics of oil mixture with the relatively viscous Number 6 fuel.

Example 1 was again repeated but the processing plates had 144 spaced circular holes of 0.0625 inch diameter. Again, most drops were below 2 microns in size.

EXAMPLE 4

Example 1 was repeated but the shear plates were as follows: the first two plates 18 and 20 were unchanged (9 holes, 0.25-inch diameter); the third and fourth plates 22 and 24 had 36 holes of 0.125-inch diameter.

When the oil was pumped through this assembly, there was a substantial improvement in the character of the emulsion (defined by a reduction in the number of water droplets over 15 microns in diameter and a reduction in the number of droplets under 2 microns in diameter) after the mixture passed the third and fourth plates before it was removed from the apparatus at outlet 34.

EXAMPLE 5

The test of Example 2 was repeated using a less viscous Number 4 fuel oil (about 500 Saybolt Seconds Universal). Instead of obtaining an excessively emulsified mixture, most water droplets were in the 2–10 micron diameter size range. This was a highly favorable condition for feed to a boiler.

EXAMPLE 6

The test of Example 2 was repeated using a less viscous, low sulfur, Number 6 fuel oil (900 Saybolt Seconds Universal at 122° F.). An excellent dispersion having most water droplets range from 3 to 8 microns was obtained.

EXAMPLE 7

The test of Example 6 was repeated using plates having 144 holes of 0.0625-inch diameter. An excellent dispersion was obtained with the water mostly dispersed in droplets in the 2–5 micron range of diameter.

EXAMPLE 8

The test of Example 2 was repeated using a low-sulfur, less-viscous, Number 6 fuel oil, and replacing the last two processing plates with plates having 144 apertures of 0.0625-inch diameter. Again, there was a substantial and desirable reduction in droplets above 15 microns and below 2 microns.

EXAMPLE 9

Waste oils having about 18% by volume of water were successfully maintained in (i.e. returned to) a suitable emulsified state by circulating the oil through a system as described in Example 8.

With such higher concentrations of water volume, the value of the smaller particle size in maintaining a suitable emulsification of the water in oil was pronounced. Waste oil mixtures treated included at this 18% loading level included mixtures having a wide viscosity range of oils.

It is also to be understood that the following claims are intended to cover all of the generic and specific features of the invention herein described and all statements of the scope of the invention which might be said to fall therebetween.

What is claimed is:

1. A process for emulsifying an oil and water mixture comprising from 3 to 20% by volume of water in oil, said process comprising the steps of (1) pumping said mixture through a conduit and at least one perforated plate mounted on a conduit and having larger perforations to obtain an emulsion of said oil in said water wherein said water is predominantly dispersed in droplets of less than about 15 microns in diameter; and (2) thereafter diminishing the number of dispersed oil droplets having diameters of less than two microns pumping said mixture through at least one additional perforated plate having smaller perforations.

2. A process as defined in claim 1 wherein said velocity of said mixture through all said perforated plates is about the same.

3. A process as defined in claim 1 wherein the distance between the perforated plates is from 50 to 200 times the diameter of apertures in that said plate closer to the inlet of said conduit.

4. A process as defined in claim 3 wherein the ration between fluid velocity through apertures and average velocity in said conduit is about 4:1.

5. A process as defined in claim 1 wherein the velocity of said mixture through said aperture is selected such that the jet merging zone following the aperture in the conduit is from 50 to 200 aperture diameters.

6. A process as defined in claim 1 wherein the ratio between aperture diameter to plate thickness is in the range of from about 0.3 to 3.0.

7. A process as defined in claim 5 wherein the ratio between fluid velocity through apertures and average velocity in said conduit is about 4:1.

* * * * *

UNITED STATES PATENT AND TRADEMARK OFFICE
CERTIFICATE OF CORRECTION

PATENT NO. : 4,755,325

DATED : 5 July 1988

INVENTOR(S) : Ian T. Osgerby

It is certified that error appears in the above—identified patent and that said Letters Patent is hereby corrected as shown below:

Claim 4, Line 1: "ration" should read --ratio--

Signed and Sealed this

First Day of November, 1988

*Attest:*

DONALD J. QUIGG

*Attesting Officer*

*Commissioner of Patents and Trademarks*